United States Patent

Wong

Patent Number: 5,675,349
Date of Patent: Oct. 7, 1997

[54] DURABLE, LIGHTWEIGHT, RADAR LENS ANTENNA

[75] Inventor: Sam H. Wong, Yorba Linda, Calif.

[73] Assignee: Boeing North American, Inc., Seal Beach, Calif.

[21] Appl. No.: 599,914

[22] Filed: Feb. 12, 1996

[51] Int. Cl.$^6$ .................................................. H01Q 15/02
[52] U.S. Cl. ........................................ 343/910; 343/911 R
[58] Field of Search ............................. 343/781 P, 910, 343/911 R, 915

[56] References Cited

U.S. PATENT DOCUMENTS

| | | | |
|---|---|---|---|
| 2,736,894 | 2/1956 | Kock | 343/910 |
| 3,273,155 | 9/1966 | Raabe | 343/910 |
| 3,287,728 | 11/1966 | Atlas | 343/910 |
| 4,358,771 | 11/1982 | Hsieh | 343/911 R X |
| 5,486,950 | 1/1996 | Collinge | 343/910 X |

OTHER PUBLICATIONS

Kogakoff, Variable BeamWidth Zoned Lens Monopulse Antenna, 4180, pp. 65–68.

Primary Examiner—Donald T. Hajec
Assistant Examiner—Tho Phan
Attorney, Agent, or Firm—Tom Streeter; Charles T. Silberberg

[57] ABSTRACT

A radar lens 14 is made from a conventional Fresnel lens 10, but replaces the conventional curved surface 32 with a stepped approximation thereto 22, 24, 26, preferably of three steps. The thickness of the stepped lens 14, at each step, is a half-wavelength or a multiple half-wavelength of the radar operating frequency in the medium of the lens 14. The half-wavelength or multiple half-wavelength separation of the steps 22, 24, 26 causes reflections from the front 16 and rear 18 surfaces to cancel, thereby minimizing the (undesirable) standing wave between the lens 14 and the feed horn or feed horns 46, 48, 50. This avoids the necessity of reducing the standing wave by presenting the curved or stepped side 18 forward. The planar side 16 of the lens 14 (unlike the stepped side 18) doesn't need to be protected from road debris. The lens 14 can therefore be molded as an integral unit of a radome, desirable in the automotive setting. This lens 14 is also thin enough (and, therefore, light enough) that it can be moved side-to-side very rapidly, preferably by a combination of cams 42, 52 and springs 44, 54. This allows a very fast scan, albeit over a limited field of view. Gimballing 56 the lens 14 and feed horns 46, 48, 50 together provides a slower scan, but gives an unlimited field of regard. Combining the two gives a fast scan and unlimited field of regard, desirable in the missile setting.

10 Claims, 5 Drawing Sheets

DURABLE, LIGHTWEIGHT, RADAR LENS ANTENNA

BACKGROUND OF THE INVENTION

The present invention relates to radar antennas, and has particular relation to radar antennas which function as a radome and also function as lenses to focus the radiation which passes through them.

When a radar is used on an automobile, it must meet the mad driving environment by having a radome which will protect the radar from mad debris as well as from air. It is desirable for the radome to also perform a focusing function for the antenna. A conventional radome durable enough to provide such service has generally been considered to be unsuitable for even semi-precise focusing.

Scanning an antenna beam rapidly with a lens antenna is usually achieved by electronically switching between multiple feed horns. However, it becomes impractical to do this in most missile sensor applications. Producing an adequate scan field of view results in unacceptably high insertion losses of the series connecting switches. It also results in unacceptably high antenna side lobe levels for far out, off axis beams.

Scanning can be accomplished by moving a durable, lightweight antenna lens back and forth in front of a fixed antenna feed. However, the speed of scanning is inversely proportional to the weight of the lens, and prior art radomes are also heavy. Fortunately, lightness and durability may be traded off with each other. If a moderate weight lens of considerable durability is placed in a protected environment, it can easily be modified to be less durable, but very light. The forward end of a missile, behind a separate radome, is such a protected environment.

SUMMARY OF THE INVENTION

The present invention overcomes these deficiencies by modifying a conventional Fresnel lens design. The conventional curved lens surface is replaced with steps approximating it, preferably three steps. The thickness of the stepped lens, at each step, is a half-wavelength or a multiple half-wavelength of the radar operating frequency in the medium of the lens. The half-wavelength or multiple half-wavelength separation of the steps causes reflections from the front and rear surfaces to cancel. This provides a nearly perfect impedance match, thereby minimizing the (undesirable) standing wave between the lens and the feed horn. This thereby further avoids the necessity of using other standing wave reduction methods, such as (a) coating one or both surfaces with an anti-reflection coating, or (b) presenting the curved or stepped side forward to avoid focusing of reflected signals at the antenna feed. Coatings are expensive, and the planar side of the lens (unlike the stepped side) doesn't need to be protected from road debris. The lens and radome can therefore be molded as an integral unit, desirable in the automotive setting.

This lens is also thin enough (and, therefore, light enough) that it can be moved side-to-side very rapidly, preferably by a combination of cams and springs. This allows a very fast scan, albeit over a limited field of view. Gimballing the lens and feed horn together provides a slower scan, but gives an unlimited field of regard. Combining the two gives a fast scan and unlimited regard, desirable in the missile setting.

DETAILED DESCRIPTION OF THE DRAWINGS

Figure 1:
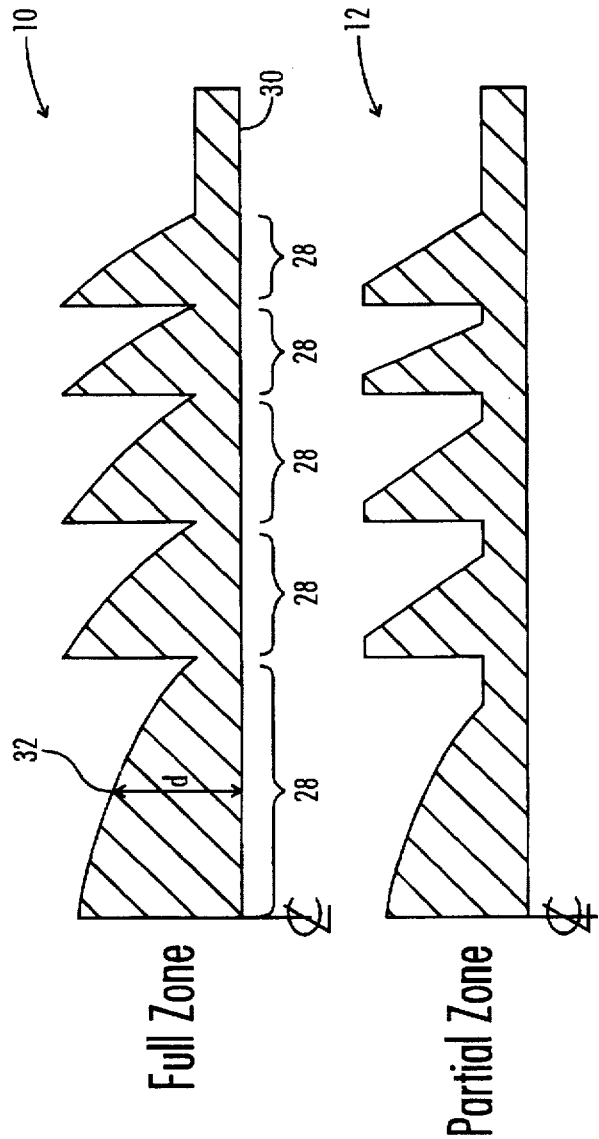
FIG. 1 shows the contour of a Fresnel lens in three embodiments: full zone 10; partial zone 12; and step zone 14.
Figure 1:
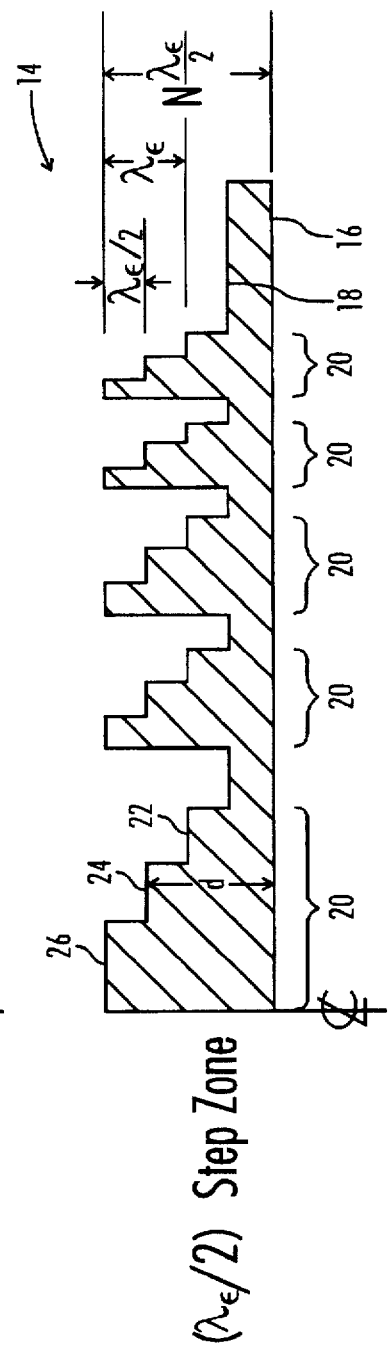

In FIG. 1, a lens 14 is made of a material, preferably a plastic which has a suitable index of refraction to electromagnetic radiation of a desired frequency, and which is hard and strong. The plastic sold under the trade name LEXAN has the desired electrical and mechanical properties, and is preferred.

The lens 14 has a from surface 16 and a rear surface 18, the front surface 16 being planar. The rear surface 18 includes a plurality of stepped Fresnel zones 20. Each stepped Fresnel zone 20 consists essentially of a plurality of steps 22, 14, 26, preferably three. Each step 22, 24, 26 is parallel to, and lies a fixed distance from, the front surface 16.

Figure 2:
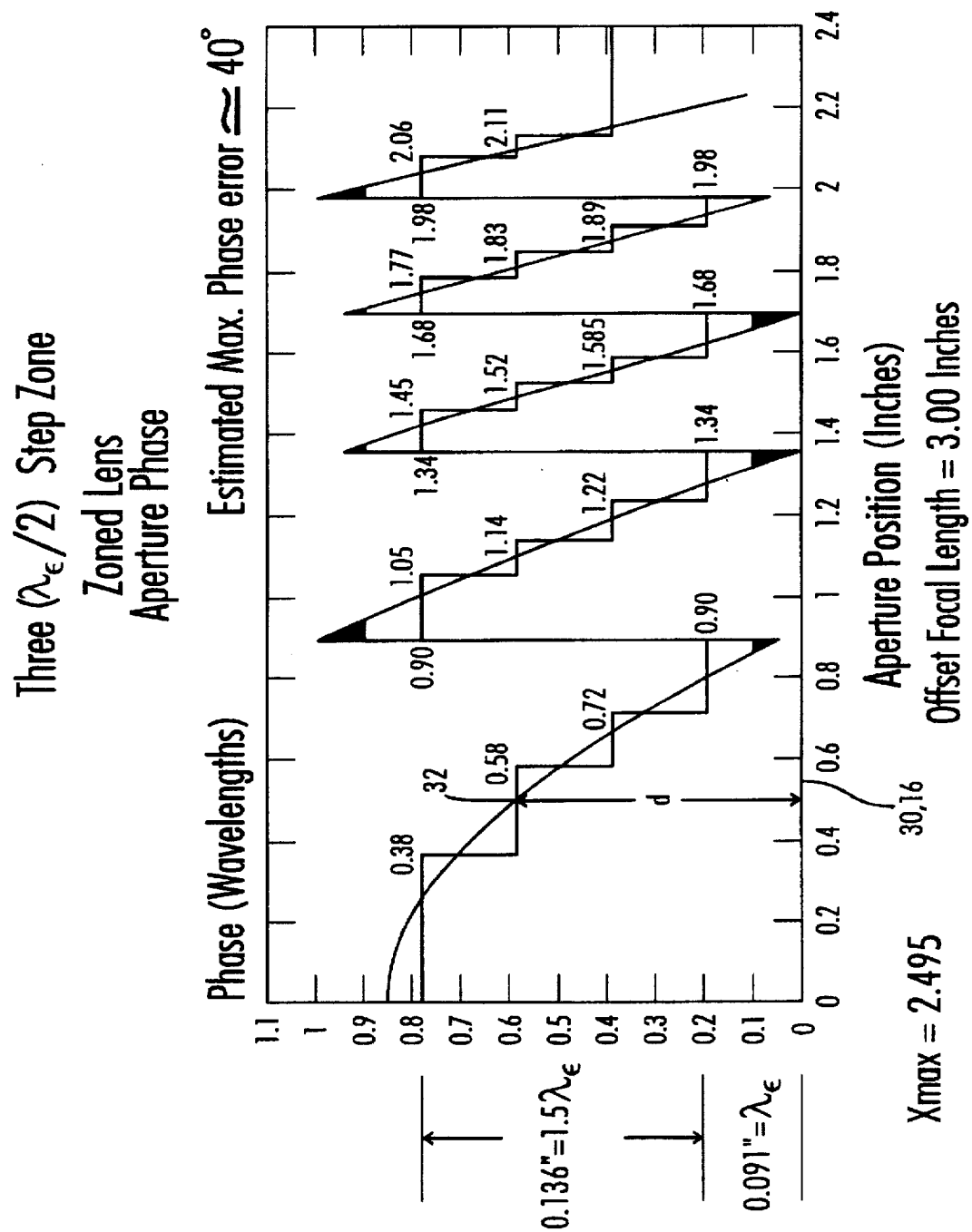
FIG. 2 shows the details of the step zone lens 14.

FIG. 2 shows each stepped Fresnel zone 20 corresponding to a conceptual, similarly refractive, conventional Fresnel zone 28. That is, to determine the location of each step of each stepped Fresnel zone 20 on the rear surface 18 of the actual lens 14, first determine its distance d from its from surface 20. Then look to a conceptual, conventional Fresnel lens 10, one which is similarly refractive. It also will be broken up into a like number of zones 28 on its rear surface 30. Find the location of the portion 32 of the corresponding, conventional, zone 28 which is the same distance d from its front surface 30. This is where the step 22, 24, 26 should be located.

Figure 3:
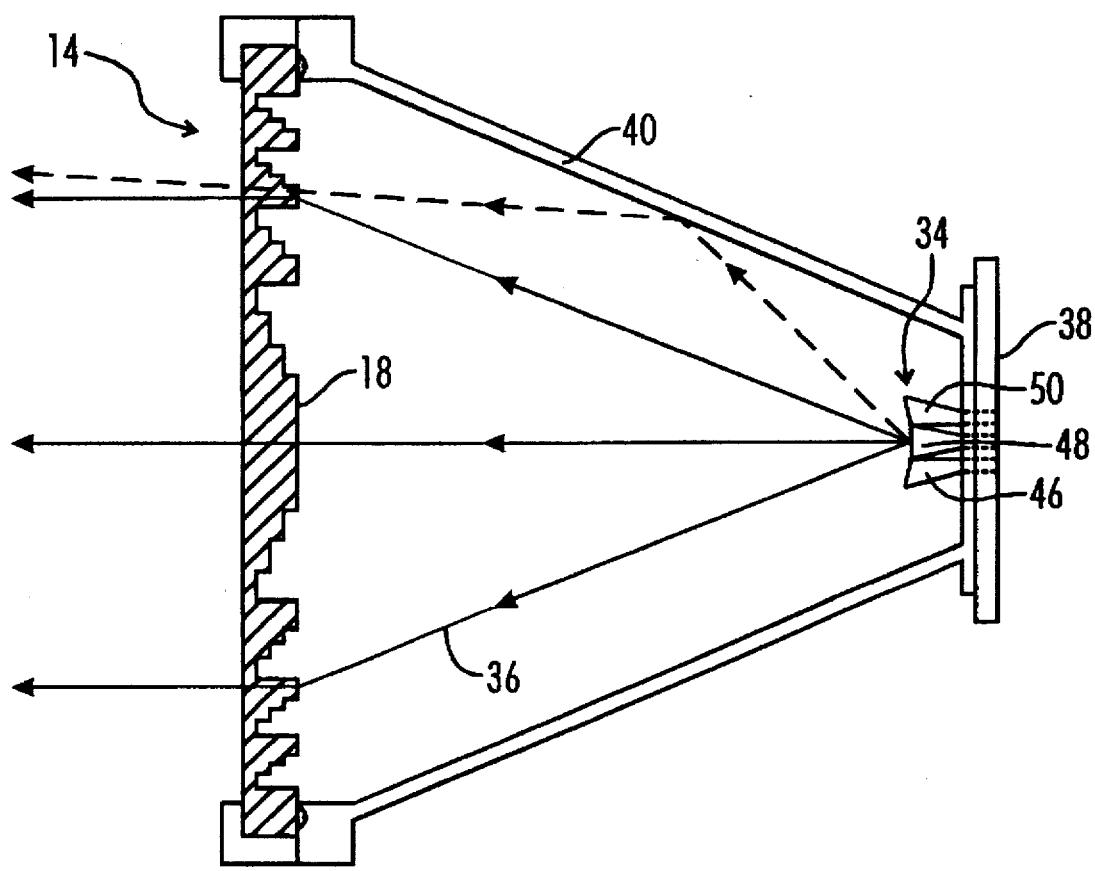
FIG. 3 shows the lens 14 in operation, refracting radar signals both directly from the feed horn or feed horns 46, 48, 50 and indirectly from an enclosing housing 40.

FIG. 3 shows the lens 14 being driven by a source 34 of electromagnetic radiation 36 of the desired frequency. This source is preferably located at a tapered end 38 of a tapering enclosure 40 which faces the rear surface 18 of the lens 14. The tapering enclosure 40 may be conductive or radio-frequency absorptive, as desired.

In FIGS. 1 and 2, the distance d to each step 22, 24, 26 from the front surface 16 is an integral multiple of half the wavelength ($\lambda_e$) at the desired frequency. This allows reflections from the front and rear surfaces 16, 18, 22, 24, 26 to cancel. This cancellation reduces or eliminates standing waves Within the enclosure 40.

Figure 4:
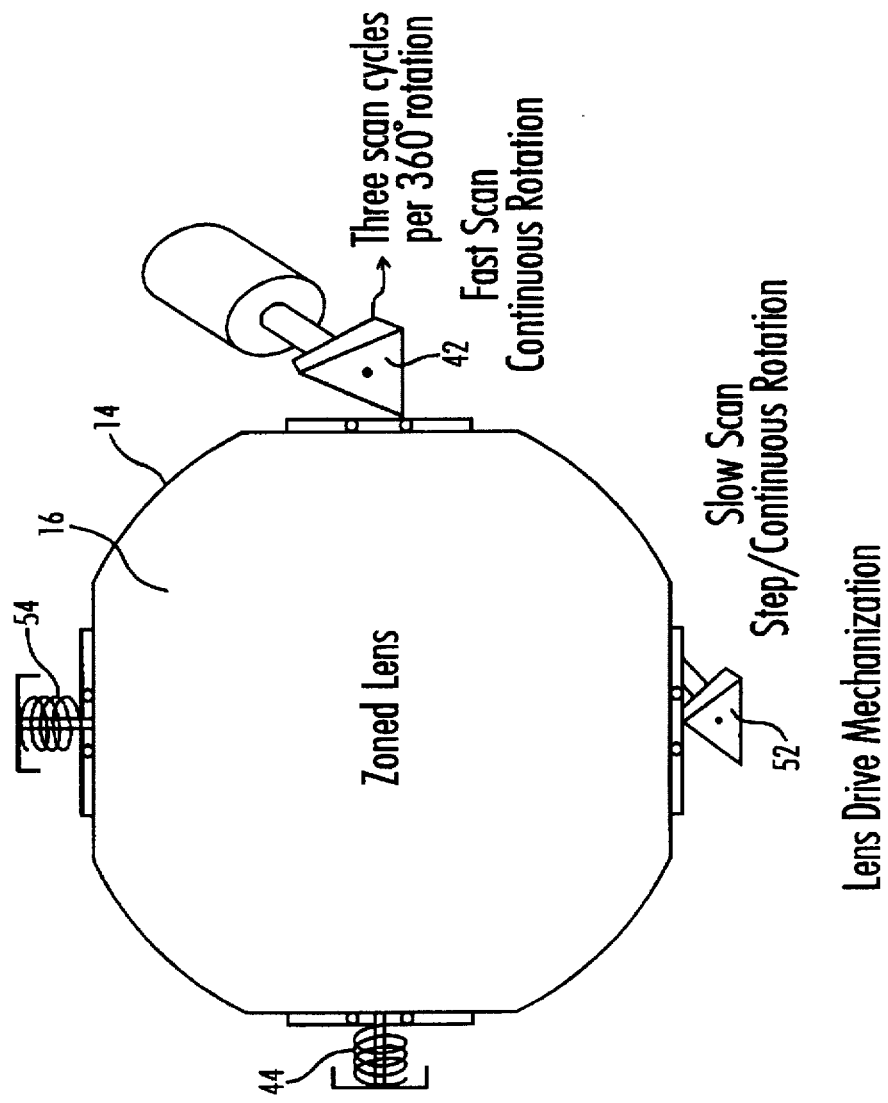
FIG. 4 shows the lens 14 being moved perpendicular to the beam of radiation through it, thereby changing the beam's direction.

FIG. 4 shows the lens 14 being moved perpendicular to the beam of radiation through it, thereby changing the beam's direction. The lens 14, being so thin, is very light, and may therefore easily be moved in a direction parallel to its front surface 16 by any suitable means. The preferred moving means is a cam 42 on one side of the lens 14 and a spring 44 on the opposite side. Moving the lens 14 perpendicular to the radiation 36 changes the direction of the beam emerging from the lens 14, and is much easier than attempting to move the feed horn, or other source 34 of electromagnetic radiation. This motion allows fine control over the beam's direction. Gross motion may be provided, if desired, by a plurality of feed horns 46, 48, 50 at the tapered end 38 of the enclosure 40. Since each feed horn 46, 48, 50 lies at a slightly different position, each produces a beam which emerges from the lens 14 in a slightly different direction. Gross motion may also be provided by gimballing the entire apparatus.

First and second moving means for moving the lens 14 in first and second directions parallel to its front surface 16, and perpendicular to each other, may be provided. As before, the preferred moving means in both directions is a cam 42, 52 on one side of the lens 14 and a spring 44, 54 on the opposite side.

Figure 5:
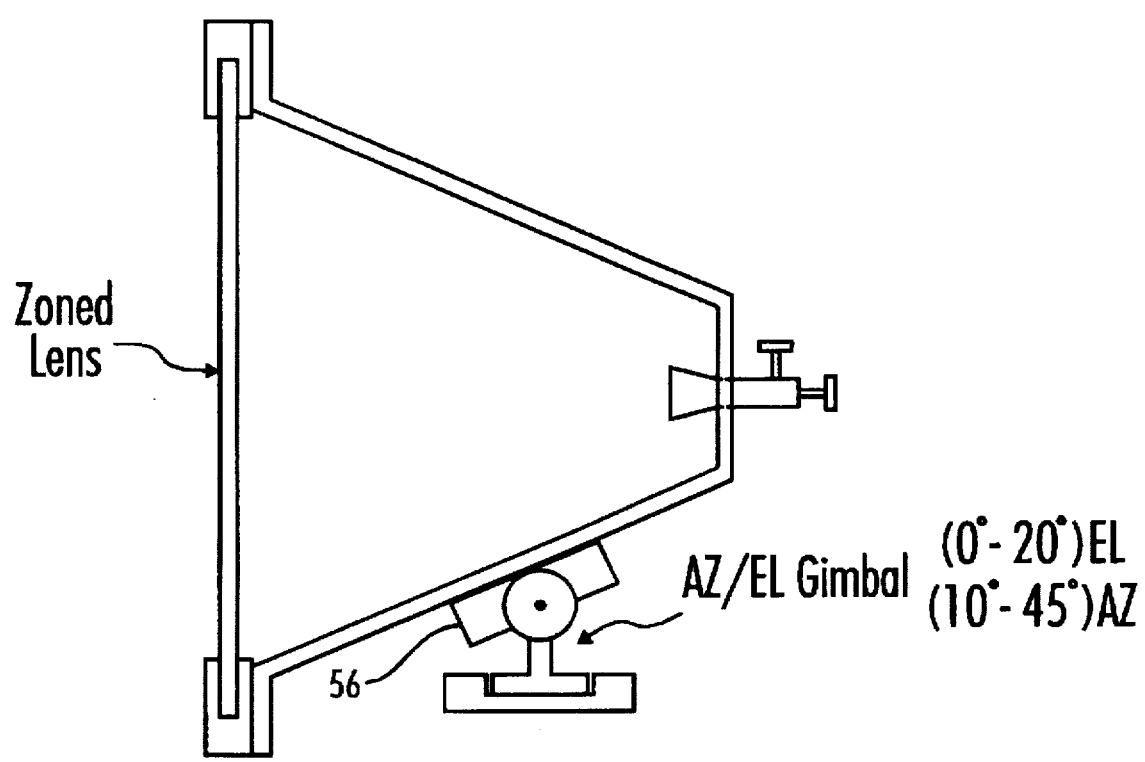
FIG. 5 shows gimballing 56 the lens 14 and feed horn or feed horns 46,48,50 together.

FIG. 5 shows gimballing 56 the lens 14 and feed horn or feed horns 46, 48, 50 together.

SCOPE OF THE INVENTION

While a particular embodiment has been shown in some detail, the true spirit and scope of the present invention are not limited thereto, but are limited only by the appended claims and their equivalents.

What is claimed is:

1. A lens comprising a material, wherein:
   (a) the material has an index of refraction to electromagnetic radiation at a desired frequency;
   (b) the index of refraction produces, within the material, a desired wavelength of the electromagnetic radiation at the desired frequency;
   (c) the material has a front surface and a rear surface;
   (d) the front surface is planar;
   (e) the rear surface includes a plurality of stepped Fresnel zones;
   (f) each stepped Fresnel zone consists essentially of a plurality of steps;
   (g) each step is parallel to, and has a fixed distance from, the front surface; and
   (h) the distance to each step from the front surface is an integral multiple of half the wavelength at the desired frequency measured in the material of which the lens is comprised.

2. The lens of claim 1, wherein each Fresnel zone has three steps.

3. The lens of claim 1, further comprising a tapering enclosure facing the rear surface of the lens.

4. The lens of claim 3, wherein the tapering enclosure is conductive.

5. The lens of claim 3, wherein the tapering enclosure is radio-frequency absorptive.

6. The lens of claim 3, further comprising a source of electromagnetic radiation of the desired frequency located at a tapered end of the tapering enclosure.

7. The lens of claim 1, further comprising a moving means for moving the lens in a direction parallel to the front surface of the lens.

8. The lens of claim 7, wherein the moving means comprises a cam on one side of the lens and a spring on an opposite side of the lens.

9. The lens of claim 1, further comprising:
   (a) a first moving means for moving the lens in a first direction parallel to the front surface of the lens; and
   (b) a second moving means for moving the lens in a second direction parallel to the front surface of the lens and perpendicular to the first direction.

10. The lens of claim 9, wherein each moving means comprises a cam on one side of the lens and a spring on an opposite side of the lens.

* * * * *